April 16, 1929. J. R. GAMMETER 1,709,207
FLEXIBLE CONNECTER
Filed March 13, 1925  3 Sheets-Sheet 1
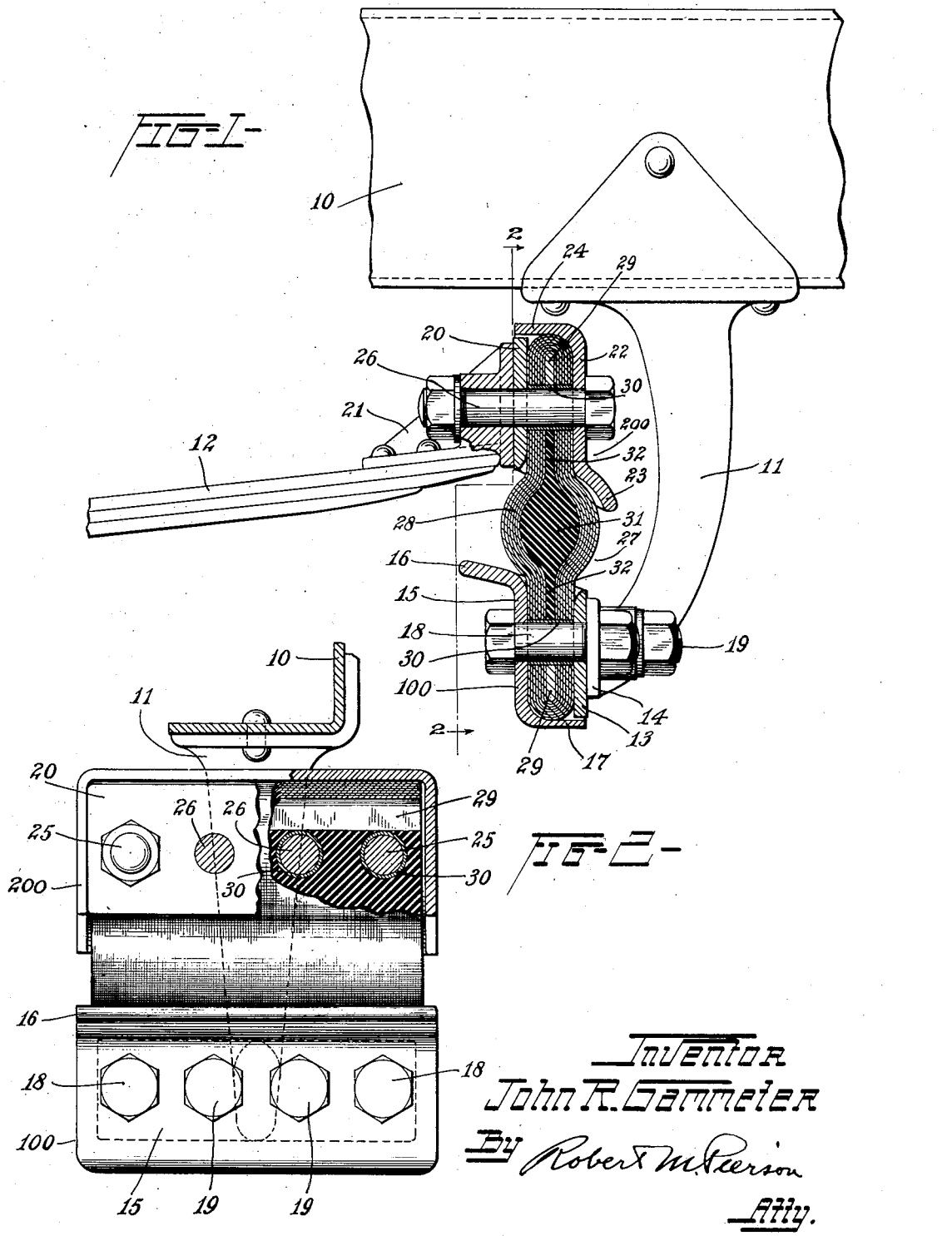

April 16, 1929.   J. R. GAMMETER   1,709,207
FLEXIBLE CONNECTER
Filed March 13, 1925   3 Sheets-Sheet 2
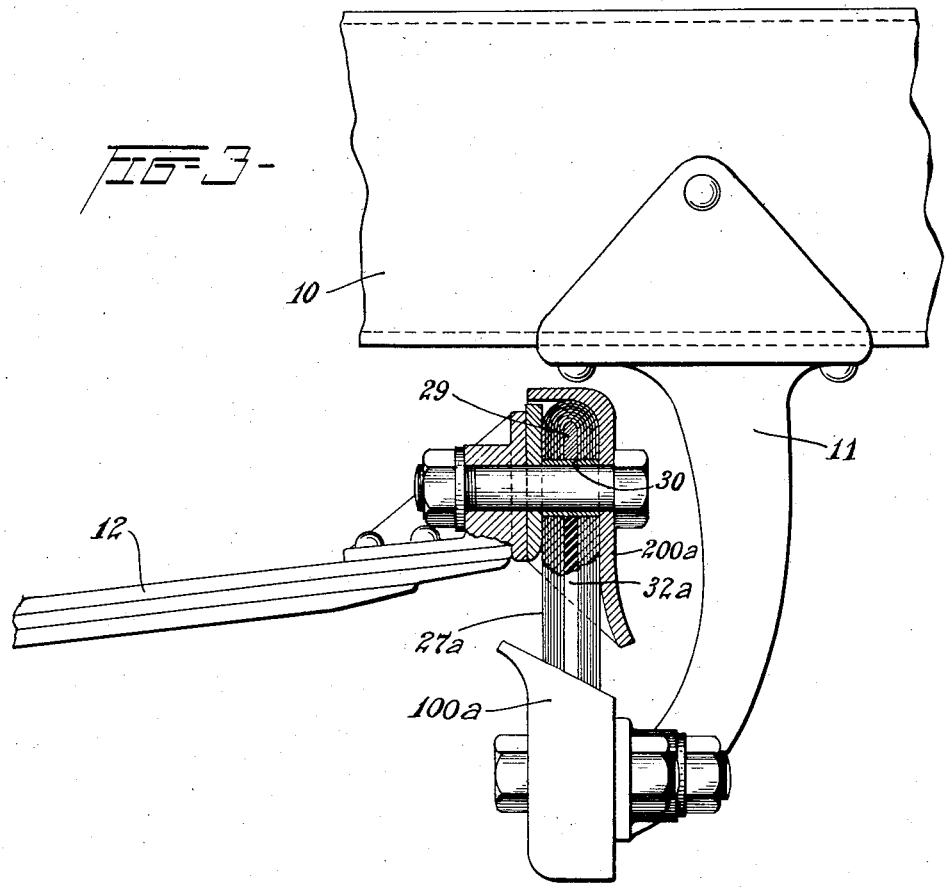
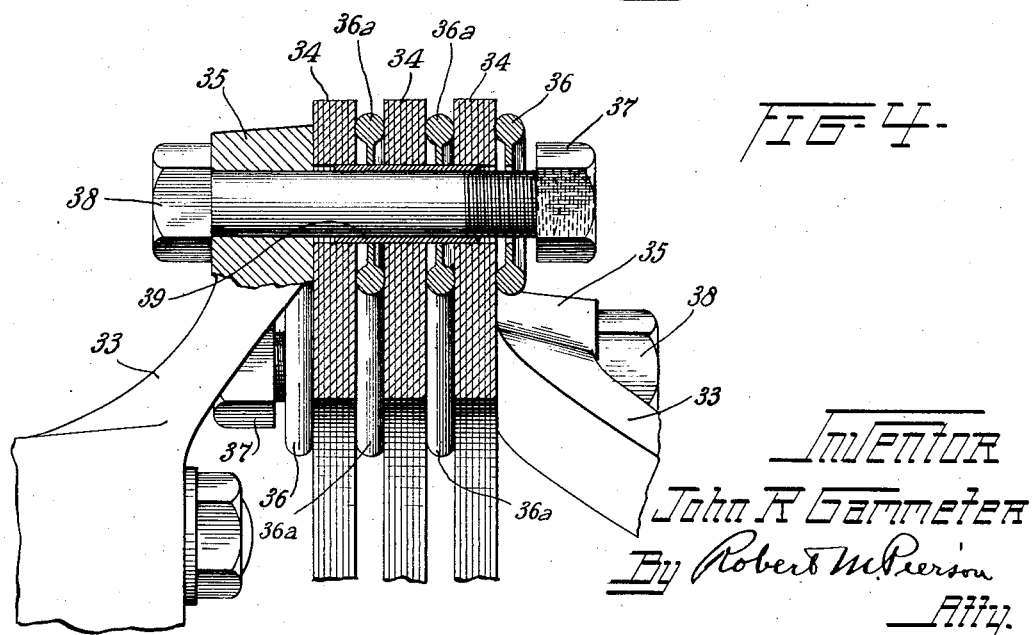

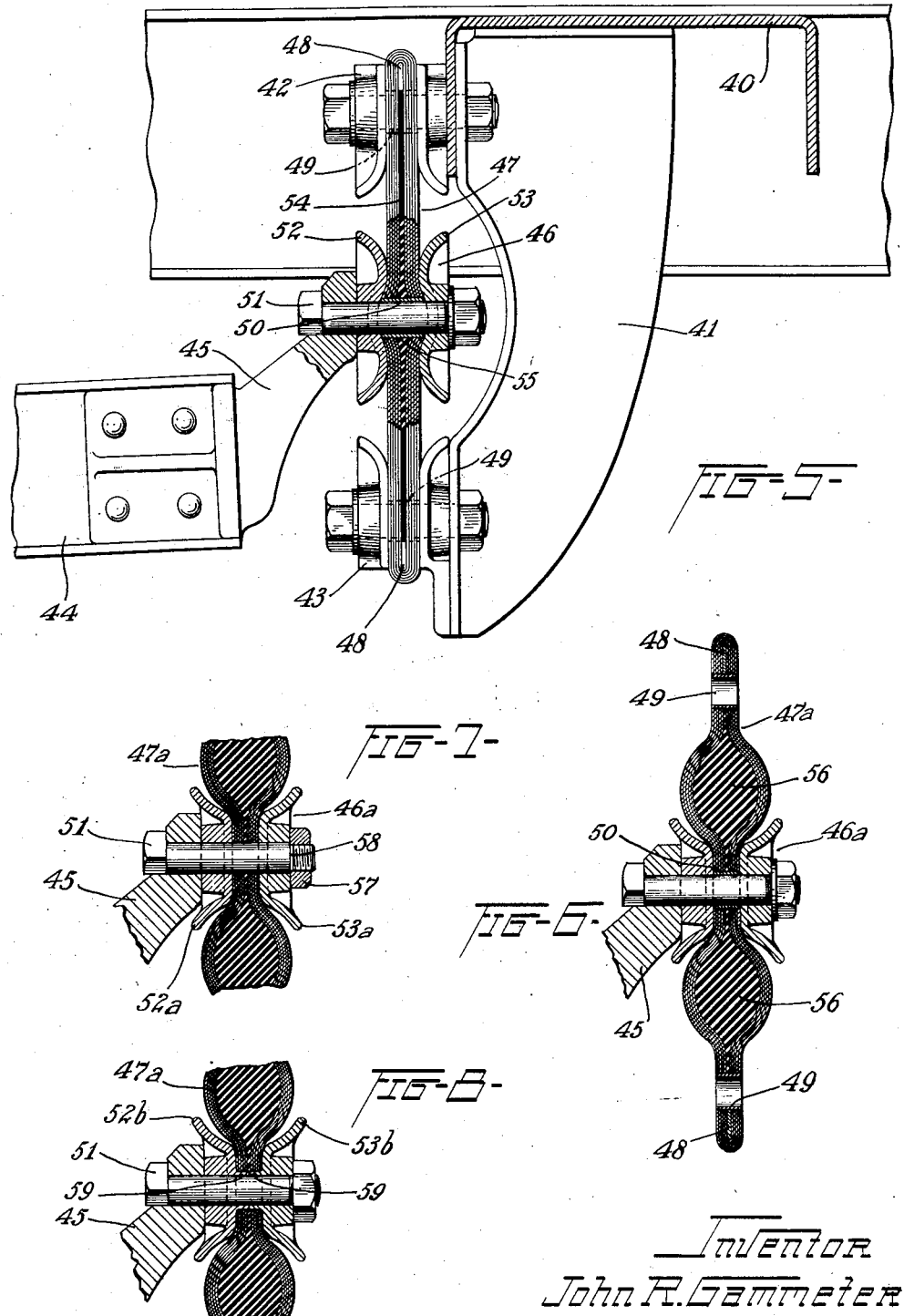

Patented Apr. 16, 1929.

1,709,207

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

FLEXIBLE CONNECTER.

Application filed March 13, 1925. Serial No. 15,245.

This invention relates to flexible elements such as vehicle spring-shackles, automobile torque-arm mountings and universal joint disks for connecting one part, and especially a relatively movable part, of a structure with another, such as a spring with a frame-bracket, a torque-arm with a frame-bracket, or the two shaft spiders of a universal joint with each other. Specifically considered, the invention relates to certain improvements in tension-spring-shackles. My general object is to improve the connection between the flexible element and the clamp or clamps by which it is attached to the adjacent structure, to the end that said element shall better resist the strains to which it is subjected in service, and more particularly, the longitudinal and bending strains. A further object is to provide a tension-spring-shackle which is better adapted to resist these strains and is also constructed to furnish a certain amount of cushion and compensating effect serving to prolong the life of the shackle and adjacent parts.

Of the accompanying drawings, Fig. 1 is a side elevation showing portions of a vehicle frame-bracket and spring provided with a flexible shackle-strap constructed according to my invention, said strap and its clamps being shown in section.

Fig. 2 is a transverse section on the line 2—2 of Fig. 1.

Fig. 3 is a side elevation, partly in section, showing a modified form of my spring-shackle.

Fig. 4 is a side elevation, partly in section, showing the application of the clamp-pressure-limiting feature of my invention to a universal joint assembly.

Fig. 5 is a side elevation, partly in section, showing the application of said pressure-limiting feature and the edge-construction feature of my invention to a torque-arm mounting.

Fig. 6 is a vertical section showing a modified form of the torque-arm mounting.

Fig. 7 is a vertical section showing a modification of the pressure-limiting feature.

Fig. 8 is a similar view showing a second modification thereof.

Referring at first to Figs. 1 and 2, 10 is a vehicle frame having a depending bracket 11 riveted thereto, and 12 is a part of one of the springs. The bracket has a vertical clamp 100 at its lower end, made up of a fixed jaw in the form of a wide plate 13, held against a slightly smaller integral, supporting plate 14 on the bracket, a horizontally-adjustable jaw in the form of a wide plate 15 provided with top and bottom flanges 16, 17, and a series of bolts; in this case, a pair of short outside ones 18 and long inside ones 19, to furnish the clamping pressure.

A clamp 200 of similar but inverted construction is provided on the spring 12, 20 being the fixed jaw-plate backed by a supporting angle-bracket 21 riveted to the top leaf of the spring, 22 being the adjustable jaw-plate formed with lower and upper flanges 23, 24, and 25, 26 being the short and long bolts which provide the clamping pressure.

A flexible shackle-strap 27 of fabric and rubber, together with some metal, construction connects the jaws 100, 200. In its preferred form, this strap comprises an endless, laminated band consisting of a sheet of rubberized woven fabric wound upon itself in a plurality of plies 28 and having its warp and weft threads laid straight, one set of threads running vertically and the other horizontally. The endless form gives finished rather than cut top and bottom edges, and while that feature is not broadly essential, it gives a somewhat stronger construction and is here used in combination with a pair of pressure distributing metal bars 29, preferably flat, located in the folds of the fabric and serving to transmit the edge-wise thrust of the strap to the clamping bolts, 18, 19, 25, 26. I prefer to interpose between these bars and the bolts a set of metal sleeves 30, surrounding the bolts and impinging against the bars. These sleeves serve the useful purpose of limiting the approaching movement of the clamping jaws 13, 15 and 20, 22, and hence limiting the amount of pressure which can be imposed upon the shackle by means of the clamps, the sleeves for this purpose being made a predetermined amount shorter than the uncompressed thickness of the shackle. This is a highly important feature in flexible spring-shackles and analogous fabric structures such as torque-arm mountings and universal joint connecters, since without such feature it is a very difficult matter to obtain the correct clamping pressure and get the same pressure on all the bolts. The tendency in the use of all such devices is to use too great a clamping pressure in order to be sure of getting enough. The excessive pressure tends to crush the fabric and allow insufficient give and take in the plane of the laminated structure between the clamps, said structure being too rigidly held, with the consequence that after considerable use the bending of the fabric across the edges of he clamps causes it to break. The pressure-limiting feature here provided enables me to use a moderate pressure and at the same time secure adequate support.

In the middle portion of the strap 27, extending throughout the horizontal width thereof is located a double-convex cushion 31 of soft, vulcanized rubber, which bulges apart the sides of the fabric structure in the working part of the shackle and is preferably continued in the form of thin webs 32 of soft rubber into the flat clamp-engaging parts of the strap as far as the metal bars 29, thus serving as elastic fillers between the fabric sides of these portions. It will be understood that these cushions and fillers and the rubberized-fabric layers are all vulcanized together, preferably under molding pressure. The flange 16 on the adjustable jaw-plate 15 serves as a cheek-plate or check to limit the bending movement of the shackle around the upper end of the clamp during upward rebound of the vehicle body after passing over a bump, when the axle is relatively depressed and the clamp 200 on the end of the spring takes a leftward angular position from that shown in Fig. 1. The flange 23 at the lower end of the jaw-plate 22 similarly serves to limit the bending of the shackle around the lower end of the upper clamp during extreme compressing of the spring in passing over a bump.

These rebound cheeks when used irrespective of the cushion 31 are not broadly claimed herein, nor do I claim broadly the idea of using a spring shackle of rubberized fabric construction.

It is to be noted that the presence of the cushion 31 tends to ease the longitudinal strains imposed upon the fabric and hence prolong the life of the shackle as well as the parts with which it is connected, and contributes to the total cushioning effect of the spring suspension as a whole. It further has a beneficial effect in acting as an elastic and deformable connecter between the fabric sides or facings of the shackle, both in tension and compression, as well as in the angular strains to which the shackle is subjected in its own plane due to changes in relative elevation of the ends of the axle with reference to the vehicle body.

In the modification shown in Fig. 3, the shackle-strap 27$^a$ is flat throughout its length, and the internal flat layer of rubber 32$^a$ acts principally as an elastic filler between the laminated, rubberized fabric sides or facings of the working and clamping portions. The cheeks of the clamps 100$^a$, 200$^a$ are slightly modified in form to correspond, but otherwise the construction is the same as previously described.

In Fig. 4 I show the clamp-pressure-limiting feature of my invention applied to a fabric and metal universal joint. 33, 33 are the spiders at the ends of the shaft sections to be connected and 34, 34 are the ordinary annular, flat, flexible disks of laminated fabric and rubber construction connecting these spiders. 35, 35 are relatively-fixed jaws on the ends of the spider-arms, and 36, 36 are adjustable jaws in the form of beaded washers adapted to be drawn against the disks by means of nuts 37 on the ends of the clamping bolts 38, there being similar beaded washers 36$^a$, 36$^a$ interposed as spacers and clamping elements between the disks 34. A pressure-limiting sleeve 39 surrounds the stem of each bolt 38 and is made a predetermined amount shorter than the uncompressed thickness of the disk and washer assembly. This view shows the parts in their uncompressed condition and, for convenience of illustration, the spiders 33 are shown somewhat farther apart than they would be when the clamps are drawn up. It will be understood that the flexible rubber and fabric disk or disks in a universal joint assembly embodying this pressure-limiting feature of my invention may be of any desired construction.

Fig. 5 shows the application of the edge-construction and pressure-limiting features of the spring-shackle shown in Figs. 1 and 2 to a flexible element serving as a connecter between a motor vehicle frame and the torque-arm extending from the driving axle. 40 is a cross-member of the vehicle frame, to which is attached a depending bracket 41. 42, 43 are a pair of clamps set apart vertically in line on the frame and bracket and each comprising suitably fixed and adjustable jaws and clamping bolts, the jaws being flared at the end where the strap 47 flexes over them, so that the bend is gradual rather than sharp.

44 is the torque-arm having a fitting 45 riveted to its end and terminating in a clamp 46 secured to the middle portion of the flexible strap element 47, whose ends are held in the clamps 42, 43. This element preferably has a width transversely of the vehicle not quite as great as its vertical length or height, and is of a construction generally similar to that described in connection with Figs. 1 to 3, modified to provide for a middle connection with the torque-arm-clamp 46. It is made of rubberized fabric, preferably in the form of a flattened, endless, laminated belt having flat metal bars 48 in the folds and pressure-limiting metal sleeves 49 surrounding the stems of the clamping bolts and impinging against these bars. The middle of the strap 47 has pressure-limiting sleeves 50 surrounding these stems of the clamping bolts 51, of which one is here shown, and serving to limit the approach of the fixed and movable jaws 52, 53 of the clamp 46. An elastic layer of soft rubber 54 is interposed between the sides of the fabric structure and vulcanized thereto, and this layer is slightly thickened at 55 between the clamping jaws 52, 53 and the fabric sides are correspondingly bulged to form a bead-like or rib-like structure contributing to the hold of the clamp 46 upon the flexible element, the jaws 52, 53 being appropriately concaved to interfit with this bead structure, which preferably extends throughout the transverse width of the clamps and flexible element.

In Fig. 6 is shown a modification of the torque-arm-mounting in which the flexible strap 47ª has an end construction similar to the foregoing for engagement with the frame clamps, but between its end portions and the torque-arm-clamp 46ª it is provided with elastic rubber cushions 56 located between and vulcanized to the fabric sides for the purpose of cushioning the shocks transmitted through the torque-arm and easing the strains upon the flexible strap. I do not herein claim the use of these cushions in a torque-arm connecter-strap, but have illustrated the same as showing another application of my improved marginal construction, including the elements 48 and 49.

Figs. 7 and 8 illustrate two modified forms of the pressure-limiting feature which may be applied to a torque-arm connecter-strap, a spring-shackle, a universal joint disk, or any analogous structure. In Fig. 7, 46ª is a clamp for the flexible element 47ª, said clamp including jaws 52ª, 53ª and a bolt 51 passing through said clamps and through the torque-arm bracket 45 or equivalent support. 57 is a nut on the end of the bolt for drawing the clamp jaws together, and 58 is a shoulder on the stem of the bolt for arresting the inward movement of said nut and thereby limiting the amount of pressure which the clamp can exert upon the flexible element 47ª.

In Fig. 8 the same pressure-limiting effect is obtained by providing the adjacent faces of the clamping jaws 52ᵇ, 53ᵇ with short tubular extensions 59 surrounding the stem of the bolt 51 and adapted to abut when the acting faces of the clamping jaws have approached to the desired minimum distance.

It will be understood that various other applications and embodiments of the invention may be made within the scope of the claims.

I claim:

1. In a spring shackle or like connection, the combination of a clamp having relatively-adjustable jaws, a flexible, compressible working element of laminated construction held in said clamp and having a clamp-free flexing portion, and means for positively limiting the pressure of the clamping jaws upon said element and thereby permitting a limited movement of the laminations upon each other within the clamp.

2. A device according to claim 1, in which the laminations of the flexible element are of fabric and bound together with vulcanized soft rubber.

3. In a spring shackle or like connection, the combination of a pair of anchorages at least one of which is a clamp having relatively-adjustable jaws, a flexible, compressible, laminated connecter of vulcanized fabric and rubber construction attached to said anchorages and having a free flexing portion between them, and means for positively limiting the pressure of the jaws upon that part of the connecter which is held in said clamp.

4. In a spring shackle or like connection, the combination of a flexible compressible, laminated strap having strength-giving plies in its sides made continuous in a loop or fold at the edge of the strap, a rigid bar in the fold, and a clamp having jaws which grip the sides of the strap and also having a portion underlying and supporting said bar.

5. In a spring shackle or like connection, the combination of a pair of relatively-movable strap-anchorages at least one of which is a strap-embracing clamp, a flexible, compressible strap of laminated fabric and vulcanized rubber construction connecting said anchorages and having at least a portion of its fabric plies continuous in a fold or loop at the edge of that portion of the strap which is held in said clamp, and a metal bar in said fold underlaid and supported by portions of the clamp extending through apertures in the strap.

6. In a spring shackle or like connection, the combination of a flexible, compressible, laminated strap having a clamp-engaged portion provided with a fold or loop at the edge thereof, a rigid bar in said fold, and a jaw clamp embracing said strap and supporting the bar, said clamp having means for positively limiting the pressure of its jaws upon the strap.

7. In a spring shackle or like connection, the combination of a flexible, compressible strap of laminated, vulcanized rubber and fabric construction having a clamp-engaged portion provided with fabric plies folded or looped at the edge thereof, a metal bar in the fold, and a clamp having jaws embracing the strap and a bolt passing through an aperture in the strap and supporting said bar, said clamp having means for positively limiting the pressure of its jaws upon the strap.

8. A device according to claim 7 in which the clamp is provided with a tubular structure surrounding the bolt and impinging upon the bar for limiting the clamping pressure.

9. A flexible strap, for spring-shackle and like connections, having a clamp-receiving portion looped at the edge thereof and formed with a transverse aperture, and a rigid bar in the loop, immediately adjacent to said aperature.

10. A flexible, laminated strap, of vulcanized rubber and fabric construction, for spring shackle and like connections, said strap having a clamp-receiving portion with plies looped at the edge thereof and formed with a transverse aperture, and a metal bar in the loop, immediately adjacent to said aperture.

11. A flexible, compressible, laminated stap, for spring shackle and like connections, having a clamp-receiving portion looped at the edge and thereof and formed with a transverse aperture, a rigid bar in the loop, immediately adjacent to said aperture, and a rigid pressure-limiting sleeve in the aperture, adapted to support said bar.

12. A flexible, compressible, laminated strap, of vulcanized rubber and fabric construction, for spring shackle and like connections, said strap having a clamp-receiving portion with rubber-connected fabric plies looped at the edge thereof, and formed with a transverse aperture, a metal bar in the loop immediately adjacent to said aperture, and a pressure-limiting metal sleeve in said aperture slightly shorter than the uncompressed thickness of said portion and adapted to take the thrust of said bar when the strap is longitudinally stressed.

13. In a spring-shackle construction, the combination with vehicle parts to be connected, one of which is an axle spring, of a tension strap connecting said parts and comprising an endless, laminating band of plies of fabric bound together with vulcanized rubber, metallic pressure-distributing members in the loops of said band, and anchoring means on said vehicle parts arranged to prevent turning of said members during flexing movements of the strap.

14. In a spring-shackle construction, the combination with vehicle parts to be connected, one of which is an axle spring, of a tension strap connecting said parts, said strap comprising a rubber core and facings of fibrous material embracing said core and held bulged apart thereby between said parts, clamping means on one of the said parts including a pair of jaws adapted to embrace the strap, and means for positively limiting the closing movement of said jaws.

15. In a spring-shackle construction the combination with vehicle parts to be connected, one of which is an axle spring, of a tension strap connecting said parts, said strap comprising a rubber core and facings of fibrous material embracing said core and held bulged apart thereby between said parts, said facings being continuous in a loop at one end of the strap, a rigid bar mounted in said loop, and clamping means on one of said parts including jaws adapted to embrace said loop and a portion adapted to underlie and support said bar.

16. In a spring-shackle construction, the combination with vehicle parts to be connected, one of which is an axle spring, of a tension strap connecting said parts, said strap comprising a rubber core and facings of fibrous material embracing said core and held bulged apart thereby between said parts, anchorages securing said strap to the said parts, and a cheek-element on one of said anchorages adapted to be contacted by the bulged portion of the strap to prevent excessively localized flexure of the latter as an incident of the spring action.

17. In a spring-shackle construction, the combination with vehicle parts to be connected, one of which is an axle spring, of a tension strap connecting said parts, said strap comprising facings of rubberized fibrous material and a cushion body of rubber embraced by, vulcanized to and holding bulged apart the said facings.

18. A flexible, compressible, laminated tension element for spring-shackle and like connections having two separated anchoring portions at least one of which is a clamp-receiving portion formed with a transverse aperture, an intervening flexing portion, and a rigid sleeve in said aperture, shorter than the uncompressed thickness of said clamp-receiving portion, for limiting the clamping pressure.

19. A flexible, compressible, laminated, vulcanized fabric and rubber tension element for spring-shackle and like connections, having two separated clamp-receiving portions formed with transverse apertures, and pressure-limiting metal sleeves in said apertures, slightly shorter than the uncompressed thickness of said clamp-receiving portions.

In witness whereof I have hereunto set my hand this 7th day of March, 1925.

JOHN R. GAMMETER.